US006688533B2

(12) United States Patent
Nines et al.

(10) Patent No.: US 6,688,533 B2
(45) Date of Patent: Feb. 10, 2004

(54) APPARATUS AND METHOD OF CONTROL FOR A HEATED TIP FUEL INJECTOR

(75) Inventors: Jerry Edward Nines, Newport News, VA (US); John F. Nally, Jr., New Port News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/893,587

(22) Filed: Jun. 29, 2001

(65) Prior Publication Data

US 2003/0015597 A1 Jan. 23, 2003

(51) Int. Cl.[7] .......................... F02D 1/06; A01G 27/00; F02M 47/02; F02M 59/00

(52) U.S. Cl. .............................. 239/5; 239/68; 239/89; 239/533.2; 239/533.3; 239/585.5

(58) Field of Search ................................ 239/5, 67, 68, 239/69, 70, 88–91, 93, 94, 95, 533.2, 533.3, 585.1–585.5; 73/61.62, 61.63, 61.71, 61.72, 61.45, 61.49

(56) References Cited

U.S. PATENT DOCUMENTS

| | | | | |
|---|---|---|---|---|
| 3,868,939 A | 3/1975 | Friese et al. | 123/179 |
| 3,918,417 A | * 11/1975 | Gambill et al. | 123/485 |
| 4,082,066 A | * 4/1978 | Long | 123/490 |
| 4,421,280 A | 12/1983 | Lewis et al. | |
| 4,579,097 A | * 4/1986 | Yamamoto et al. | 123/438 |
| 4,870,943 A | 10/1989 | Bradley | 123/558 |
| 5,114,077 A | 5/1992 | Cerny | 239/483 |
| 5,361,990 A | 11/1994 | Pimentel | 239/133 |
| 5,642,862 A | 7/1997 | Wakeman et al. | 239/585.4 |
| 5,758,826 A | 6/1998 | Nines | 239/136 |
| 5,765,750 A | 6/1998 | Pace et al. | 239/5 |
| 5,829,418 A | 11/1998 | Tamura et al. | |
| 5,865,158 A | 2/1999 | Cleveland et al. | |
| 5,890,653 A | 4/1999 | Kelly | |
| 5,915,626 A | 6/1999 | Awarzamani et al. | 239/135 |
| 5,937,800 A | 8/1999 | Brown et al. | |
| 5,941,211 A | 8/1999 | Brehob et al. | |
| 6,102,303 A | 8/2000 | Bright et al. | |
| 6,109,543 A | 8/2000 | Bright et al. | |
| 6,135,360 A | 10/2000 | Ren et al. | 239/136 |
| 6,176,226 B1 | 1/2001 | Nines et al. | 123/549 |
| 6,267,105 B1 | * 7/2001 | Bertossi | 123/525 |
| 6,279,394 B1 | * 8/2001 | Svoboda et al. | 73/204.26 |
| 6,332,457 B1 | 12/2001 | Imoehl | 123/549 |

FOREIGN PATENT DOCUMENTS

| | | |
|---|---|---|
| DE | 198 12 092 A1 | 9/1998 |
| JP | 04366585 | 12/1992 |
| WO | WO 99 30644 | 10/1996 |
| WO | WO 99 05412 | 2/1999 |

* cited by examiner

*Primary Examiner*—Davis Hwu

(57) ABSTRACT

A method and apparatus for measuring and controlling the temperature of fuel inside a fuel injector is provided. A first resistive element having a resistance that varies with temperature is positioned proximal the fuel within a fuel injector and a second resistive element having a known resistance is placed in series with the first resistive element and connected at a node. When a known voltage is applied across the resistor-divider network, the voltage generated at the node corresponds to the temperature of the fuel within the fuel injector. The first resistive element may also be used to heat the fuel within the injector to a predetermined temperature. Logic circuitry prevents energizing the first resistive heating element if any fuel injector coils are energized, thereby ensuring full voltage is available to drive the fuel injector coils.

14 Claims, 2 Drawing Sheets

APPARATUS AND METHOD OF CONTROL FOR A HEATED TIP FUEL INJECTOR

FIELD OF THE INVENTION

The invention relates to fuel injectors for internal combustion engines, generally, and to heated tip fuel injectors, specifically. More specifically, this invention relates to a method and apparatus for controlling heated tip fuel injectors.

BACKGROUND OF THE INVENTION

Fuel injectors are widely used for metering fuel into the intake manifold or cylinders of automotive engines. Fuel injectors typically comprise a housing containing a volume of pressurized fuel, a fuel inlet portion, a nozzle portion containing a needle valve, and an electromagnetic solenoid or other mechanism for actuating the needle valve. When the needle valve is actuated, the pressurized fuel sprays out through an orifice in the valve seat and into the engine.

In order to reduce emissions, it is desirable to have the fuel vaporize as it sprays out of the injector orifice. However, during cold starting conditions, fuel vaporization can be difficult to achieve. For this reason, cold starts account for a large proportion of engine emissions.

The use of fuel injector heaters has been proposed to overcome this problem. Fuel injector heaters may typically take the form of external heater jackets surrounding the injector. Preheating fuel during cold start conditions is known to reduce emissions caused by incomplete fuel vaporization during cold starts.

However, because the heating element of heated injectors typically consumes a significant amount of current during start-up, a voltage drop often occurs across the energy source (e.g., a battery) and across the internal resistance of the wiring and connectors in the fuel system wiring harness. As a result, the voltage available to actuate the fuel injector coil may be diminished, which can negatively influence the dynamic flow of the fuel injector. The present invention minimizes this undesirable voltage drop across the fuel injector coils, thereby ensuring full voltage is present to actuate the injectors and minimizing the effect of the heating elements on the dynamic flow of the injectors.

SUMMARY OF THE INVENTION

A method of measuring the temperature of fuel inside a fuel injector is provided. The method includes positioning a first resistive element having a resistance that varies with temperature proximal a fuel injector; electrically connecting a second resistive element having a certain resistance in series with the first resistive element at a node to form a resistor-divider network; and applying a known voltage across the resistor-divider network while measuring the voltage present at the node. The measured voltage corresponds to the temperature of the fuel within the fuel injector.

A method of controlling the temperature of fuel inside a fuel injector is also provided. The method includes positioning a first resistive element having a resistance that varies with temperature proximal a fuel injector; electrically connecting a second resistive element having a certain resistance in series with the first resistive element at a node to form a resistor-divider network; applying a known voltage across the resistor-divider network while measuring the voltage present at the node, the measured voltage corresponding to the temperature of the fuel within the fuel injector; comparing the voltage corresponding to the temperature of the fuel within the fuel injector with a predetermined value; and selectively energizing the first resistive element to heat the fuel within the fuel injector if the temperature corresponding to the measured voltage is less than the predetermined value.

A circuit for measuring the temperature of fuel inside a fuel injector is also provided. The circuit includes a first resistive element having a resistance that varies with temperature positioned proximal the fuel within a fuel injector. A second resistive element having a certain resistance placed in series with the first resistive element and electrically connected at a node to form a resistor-divider network. Applying a known voltage across the resistor-divider network generates a voltage at the node corresponding to the temperature of the fuel within the fuel injector.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

The presently preferred embodiments will be described primarily in relation to automotive applications of heated fuel injectors. However, as will be appreciated by those skilled in the art, these embodiments are not so limited and may be used in any application where fuel injectors are used.

As a matter of convenience in the descriptions that follow, a "high" logic level corresponds to approximately 5 volts and a "low" logic level corresponds to "ground" (i.e., substantially zero volts). However, as will be appreciated by those skilled in the art, many other reference voltages may be used to represent the binary logic states described herein.

Examples of heated tip fuel injectors are disclosed in U.S. Pat. No. 6,109,542, entitled "Method of Preheating Fuel with an Internal Heater" to Bright et al., U.S. Pat. No. 6,102,303, entitled "Fuel Injector with Internal Heater" to Bright et al, and in U.S. Pat. No. 5,758,826, entitled "Fuel injector with Internal Heater" to Nines. The contents of the aforementioned three U.S. patents are hereby incorporated in their entireties into the present specification by reference.

Figure 1:
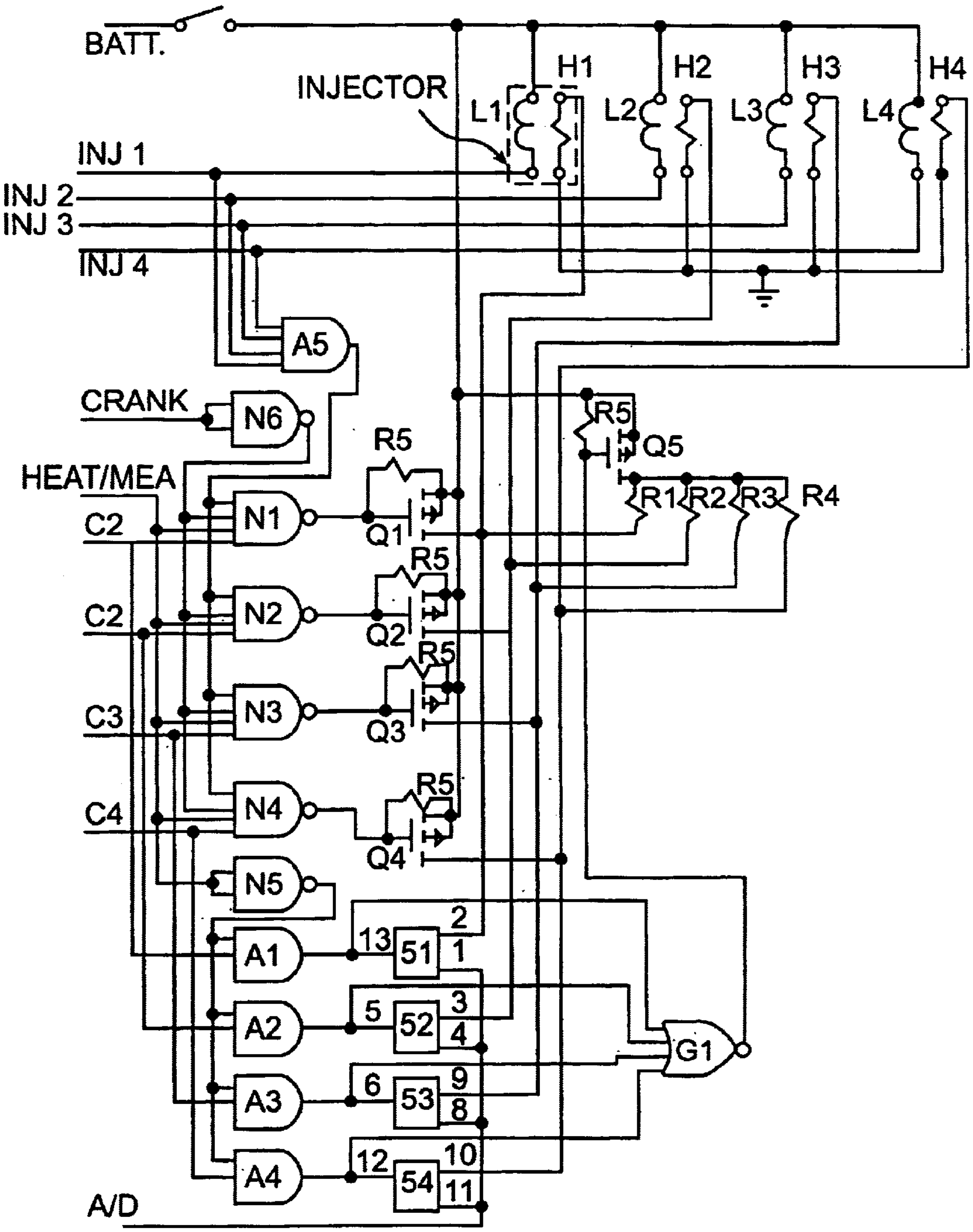
FIG. 1 is a schematic of an electrical circuit for controlling a heated tip fuel injector according to a presently preferred embodiment.
Figure 2:
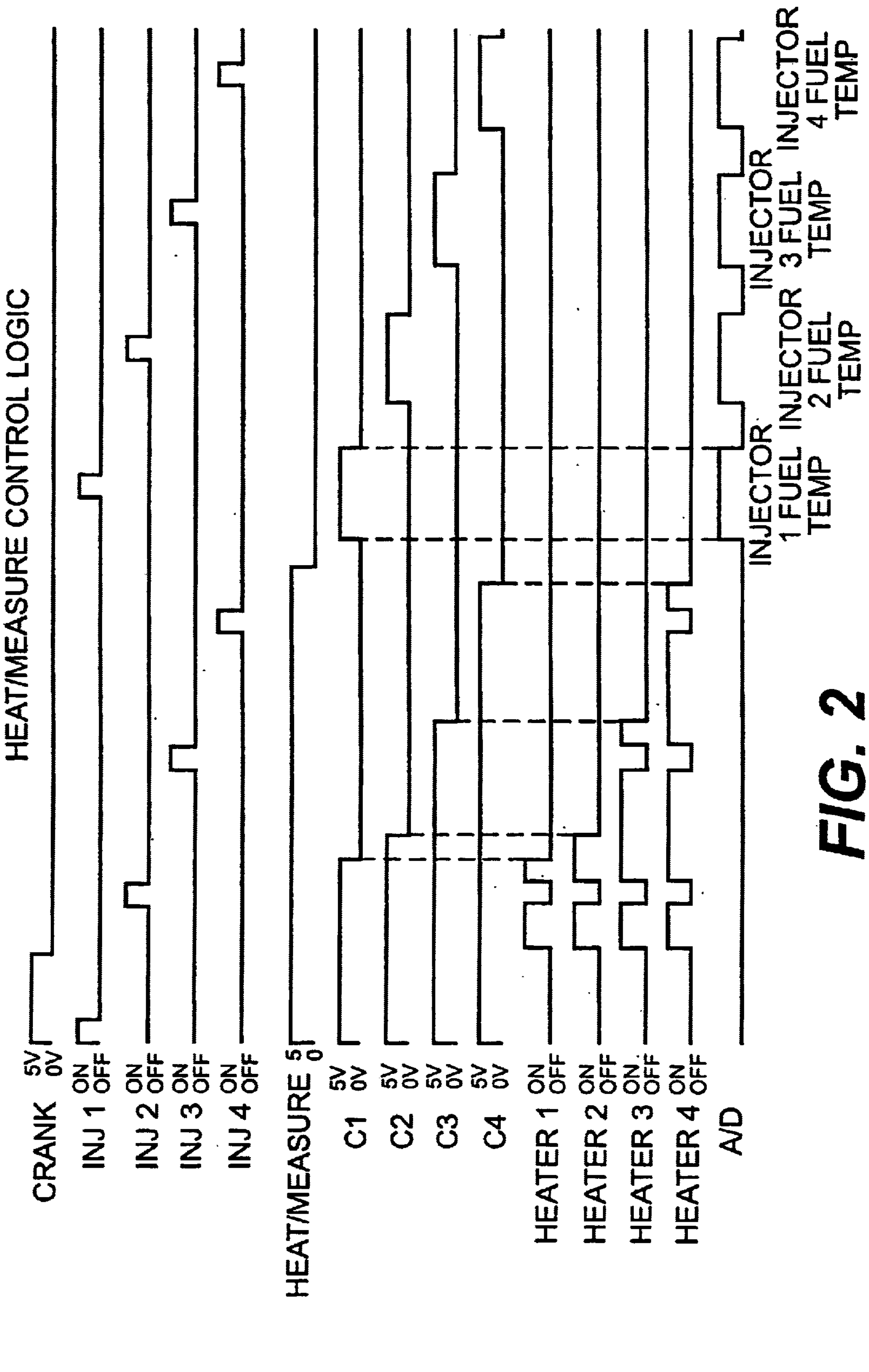
FIG. 2 is a timing diagram illustrating the control logic and ON-OFF relationships of fuel injector coils, heaters, and control lines of the circuit depicted in FIG. 1, according to a presently preferred embodiment.

FIG. 1 depicts an electrical circuit for monitoring and controlling the fuel temperature of fuel inside a fuel injector according to a presently preferred embodiment. As shown in FIG. 1, the following signals are provided by the engine control unit (ECU):

INJ1–INJ4 are the return to ground lines of the injector coils through the ECU. When the ECU effectively pulls any one of lines INJ1–INJ4 "low" (e.g., to zero volts), the corresponding fuel injector is actuated.

CRANK is a signal that is "high" (e.g., 5 volts) when the engine is in crank mode (i.e., starter motor running). In the presently described preferred embodiment, the fuel injector heaters are maintained turned off during CRANK mode via "NAND" gate N6.

HEAT/MEASURE is a signal that is "high" (e.g., 5 volts) when the ECU requests that any of the fuel injector heaters be turned on. The HEAT/MEASURE signal will be "low" (e.g., zero volts) when the ECU requests a temperature measurement from one of the fuel injectors.

C1–C4 are the individual control lines for each of the respective fuel injector heaters. If the HEAT/MEASURE signal is "high" (e.g., 5 volts is applied to HEAT/MEASURE) and the engine is not in CRANK mode and none of the injectors are firing (i.e., INJ1–INJ4 are "high"), then applying a "high" signal (e.g., 5 volts) to any of control lines C1–C4, will turn the corresponding heater on. In the presently described preferred embodiment, multiple fuel injector heaters may be turned on simultaneously. For example, applying 5 volts to C2 and C4 under these conditions will result in fuel injector heaters H2 and H4 being turned on.

In operation, when the HEAT/MEASURE signal is "low" (e.g., zero volts), the ECU can individually select the fuel injector to measure the fuel temperature in by applying a "high" (e.g., 5 volt) signal to the respective C1–C4 control line. In the presently described preferred embodiment, all heaters must be turned off before a temperature measurement is made and the fuel temperature is measured in one fuel injector at a time.

In the presently described preferred embodiment, the analog to digital A/D input to the ECU is a single channel input. As shown in FIG. 1, the input to A/D is multiplexed between the four injector-heater resistor divider circuits H1 and R1, H2 and R2, H3 and R3, and H4 and R4. In this configuration, only one injector heater can be monitored at a time, but any injector heater can be monitored at any time except when any of the heaters are turned on. For example, a request from the ECU to monitor fuel temperature may be initiated by applying a "low" signal (e.g., zero volts) to the HEAT/MEASURE input and a "high" signal (e.g., 5 volts) to heater control line C1. This will result in the output of "AND" gate A1 being driven "high" and transistor Q5 being turned on and connecting the power source (i.e., battery voltage) to resistor divider R1 and the associated heater H1. At the same time electronic switch S1 is turned on and the voltage drop across H1 is applied to the A/D input to the ECU. The voltage applied to the A/D ECU input is a representation of the fuel temperature inside the selected fuel injector.

This fuel temperature information may be used by the ECU, or its equivalent, to maintain near-optimal fuel temperature under cold start or other conditions by selectively activating resistive heating elements proximal the fuel injectors. According to a presently preferred embodiment, the resistive heating elements, which have resistance that varies with temperature, preferably are positive temperature coefficient (PTC) thermisters. The fuel temperature information may also provide fuel injector diagnostic information that may be used, for example, by an emission self-testing algorithm.

The circuit structure depicted in FIG. 1 further comprises "NAND" gates N1–N4 that provide control over MOSFETs Q1–Q4 and the respective fuel injector heater elements H1–H4. In the presently described preferred embodiment, "NAND" gate N5 provides a signal inversion of the HEAT/MEASURE signal and "NAND" gate N6 provides a signal inversion of the CRANK signal.

In the presently described preferred embodiment, gate G1 controls MOSFET Q5 that supplies power supply voltage to the resistor driver network R1–R4 and the respective fuel injector heater elements H1–H4. Resistors R5 are pull up resistors for the MOSFETs Q1–Q5.

"AND" gates A1–A4 provide control over the respective electronic switches S1–S4. Switches S1–S4 select the appropriate injector HEATER to be connected to the A/D channel in the ECU. "AND" gate A5 monitors the injector coil lines and disables the heater turn on control if any of the injectors are turned on. Because the fuel injector heaters are always switched off during the injector cycle, the voltage drop across the injector coil due to the heater circuitry is eliminated and the dynamic flow of the fuel injectors is not disturbed by the presence of the heating elements.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but have the full scope defined by the language of the following claims, and equivalents thereof.

For example, although the injectors depicted in FIG. 1 each have a four-pin connector to accommodate the heating elements H1–H4, it is contemplated that other connector pin arrangements may be used without departing from the scope of the embodiments described herein. Further, it is contemplated that different gate arrangements may be employed to achieve substantially the same logic control and that the circuitry herein described may be implemented using discrete components, as a custom integrated circuit, or any combination thereof.

Further, while the presently preferred embodiments have been described primarily with reference to the circuit shown in FIG. 1 for a four-cylinder engine, it will be apparent to those skilled in the art that the circuit described herein may be easily modified to accommodate engines having any number of cylinders.

We claim:

1. A method of measuring the temperature of fuel inside a fuel injector comprising:
   - positioning a first resistive element having a resistance that varies with temperature in a fuel path within the fuel injector;
   - electrically connecting a second resistive element having a certain resistance in series with the first resistive element at a node to form a resistor-divider network;
   - applying a known voltage across the resistor-divider network while measuring the voltage present at the node, the measured voltage corresponding to the temperature of the fuel within the fuel injector;
   - positioning said first resistive element having a resistance that varies with temperature.

2. The method according to claim 1, further comprising comparing the voltage corresponding to the temperature of the fuel within the fuel injector with a predetermined value and providing the results of the comparison to an emission self-testing algorithm.

3. The method according to claim 1, wherein positioning said first resistive element having a resistance that varies with temperature further comprises providing a positive temperature coefficient (PTC) thermistor.

4. A method of controlling the temperature of fuel inside a fuel injector comprising:
   - positioning a first resistive element having a resistance that varies with temperature proximal a fuel injector;

electrically connecting a second resistive element having a certain resistance in series with the first resistive element at a node to form a resistor-divider network;

applying a known voltage across the resistor-divider network while measuring the voltage present at the node, the measured voltage corresponding to the temperature of the fuel within the fuel injector;

comparing the voltage corresponding to the temperature of the fuel within the fuel injector with a predetermined value;

selectively energizing the first resistive element to heat the fuel within the fuel injector if the temperature corresponding to the measured voltage is less than the predetermined value.

5. The method according to claim 4, wherein selectively energizing the first resistive element to heat the fuel within the fuel injector if the temperature corresponding to the measured voltage is less than the predetermined value occurs only when no fuel injector coils are energized.

6. The method according to claim 4, wherein comparing the voltage corresponding to the temperature of the fuel within the fuel injector with a predetermined value further comprises providing the results of the comparison to an emission self-testing algorithm.

7. The method according to claim 4, wherein positioning said first resistive element having a resistance that varies with temperature further comprises positioning said first resistive element in a fuel path within the fuel injector.

8. The method according to claim 7, wherein positioning said first resistive element having a resistance that varies with temperature proximal a fuel injector further includes providing a positive temperature coefficient (PTC) thermistor.

9. A circuit for measuring the temperature of fuel inside a fuel injector comprising:

a first resistive element having a resistance that varies with temperature positioned in a fuel path within a fuel injector;

a second resistive element having a certain resistance placed in series with the first resistive element and electrically connected at a node to form a resistor-divider network such that the application of a known voltage across the resistor-divider network generates a voltage at the node corresponding to the temperature of the fuel within the fuel injector.

10. The circuit according to claim 9, further comprising logic circuitry that compares the voltage corresponding to the temperature of the fuel within the fuel injector with a predetermined value.

11. A circuit for measuring the temperature of fuel inside a fuel injector comprising:

a first resistive element having a resistance that varies with temperature positioned proximal the fuel within a fuel injector;

a second resistive element having a certain resistance placed in series with the first resistive element and electrically connected at a node to form a resistor-divider network, wherein applying a known voltage across the resistor-divider network generates a voltage at the node corresponding to the temperature of the fuel within the fuel injector; further comprising logic circuitry that compares the voltage corresponding to the temperature of the fuel within the fuel injector with a predetermined value and selectively energizes the first resistive element to heat the fuel within the fuel injector if the temperature corresponding to the measured voltage is less than the predetermined value.

12. The circuit according to claim 11, wherein said first resistive element having a resistance that varies with temperature is positioned in a fuel path within the fuel injector.

13. The circuit according to claim 11, wherein said first resistive element having a resistance that varies with temperature comprises a positive temperature coefficient (PTC) thermistor.

14. A circuit for measuring the temperature of fuel inside a fuel injector comprising:

a first resistive element having a resistance that varies with temperature positioned proximal the fuel within a fuel injector;

a second resistive element having a certain resistance placed in series with the first resistive element and electrically connected at a node to form a resistor-divider network, wherein applying a known voltage across the resistor-divider network generates a voltage at the node corresponding to the temperature of the fuel within the fuel injector; further comprising logic circuitry that compares the voltage corresponding to the temperature of the fuel within the fuel injector with a predetermined value and selectively energizes the first resistive element to heat the fuel within the fuel injector if the temperature corresponding to the measured voltage is less than the predetermined value; and logic circuitry that prevents energizing the first resistive element if any fuel injector coils are energized.

* * * * *